United States Patent [19]

Stachowicz

[11] 4,332,409
[45] Jun. 1, 1982

[54] COMBINATION FORK

[75] Inventor: Edward Stachowicz, Philadelphia, Pa.

[73] Assignee: BMS Roasting Equipment Corporation, Philadelphia, Pa.

[21] Appl. No.: 167,574

[22] Filed: Jul. 10, 1980

[51] Int. Cl.³ .............................................. A47J 43/28
[52] U.S. Cl. ........................................ 294/2; 30/125; 30/142; 30/322; D7/99
[58] Field of Search ...................... 294/2; 30/322, 129, 30/139, 147, 148, 150, 125, 142; D7/137, 151, 152, 94, 102

[56] References Cited

U.S. PATENT DOCUMENTS

| | | | |
|---|---|---|---|
| 604,965 | 5/1898 | Cartwright | 30/322 |
| 749,414 | 1/1904 | Washington | 30/125 |
| 1,398,621 | 11/1921 | Braddick | D7/99 |
| 1,814,547 | 7/1931 | Edwards | 30/147 |
| 2,545,121 | 3/1951 | Szopa | 30/142 |
| 2,877,547 | 3/1959 | Feaster | 30/322 |
| 3,410,457 | 11/1968 | Brown | 30/125 |

Primary Examiner—James B. Marbert
Attorney, Agent, or Firm—Seidel, Gonda, Goldhammer & Panitch

[57] ABSTRACT

A combination fork has a handle at one end of an elongated shaft, and tines are provided at the other end of the shaft for cooking food morsels over an open source of heat. The handle of the cooking fork includes at the butt end thereof an open bore. A smaller fork is adapted to be force-fit into the bore. The smaller fork may be extracted from the bore to remove the cooked food morsels from the tines of the larger fork.

In a preferred embodiment, the bore in the larger fork is generally cylindrical and extends substantially the length of the handle. The smaller fork is inserted into the bore with the tines first, and the handle of the smaller fork has a small conical taper enlarging toward the butt end, whereby the force-fit inside of the bore of the larger fork is accomplished by pushing the small fork into the bore to a point where the diameter of the tapered handle equals or slightly exceeds the diameter of the mouth of the bore.

6 Claims, 2 Drawing Figures

COMBINATION FORK

BACKGROUND OF THE INVENTION

Large forks having elongated shafts are commonly used in the cooking of foods over open fires or charcoal. Such forks may be colloquially referred to as barbecue forks. These forks may be used to manipulate food on a grill over an open fire in a fireplace or charcoal pit while the long shafts permit a sufficient standoff distance so that the user is not bothered by the heat. Such forks may also be used to directly support meat or other food morsels such as marshmallows or vegetables over the open fire. The food is skewered on the tines and held over the open flame where it may be rotated in order to cook evenly.

When cooking is complete, the hot food morsel must be removed from the tines of the fork. It is advantageous to do this with a smaller fork of the type that is commonly used for eating. Previously this required that forks of two sizes be separately provided for these two functions, one elongated fork for cooking and one smaller fork for removing and eating the morsel. This invention is related to the provision of a self-contained unit wherein a smaller fork may conveniently be stored in a larger cooking fork and then be separated when necessary to remove the food morsel from the larger fork or to be used in eating the food morsel.

This self-contained fork combination may be provided in a set, and may particularly be adapted for use with a unique support frame for holding the forks and positioning them to suspend the morsel in proper relation to the open fire. Such a frame is disclosed in my co-pending application entitled Barbecue Fork Holder filed this same day.

SUMMARY OF THE INVENTION

A combination fork comprising a handle at one end of an elongated shaft. Tines are provided at the other end of the shaft for cooking food morsels over an open source of heat. The handle of the cooking fork includes at the butt end thereof an open bore. A smaller fork is adapted to be force-fit into said bore. The smaller fork may be extracted from the bore to remove the cooked food morsel from the tines of the larger fork.

In a preferred embodiment, the bore in the larger fork is generally cylindrical and extends substantially the length of the handle. The smaller fork is inserted into the bore with the tines first, and the handle of the smaller fork has a small conical taper enlarging toward the butt end, whereby the force-fit inside of the bore of the larger fork is accomplished by pushing the small fork into the bore to a point where the diameter of the tapered handle equals or slightly exceeds the diameter of the mouth of the bore.

For the purpose of illustrating the invention, there is shown in the drawing a form which is presently preferred; it being understood, however, that this invention is not limited to the precise arrangements and instrumentalities shown.

DETAILED DESCRIPTION OF THE PREFERRED EMBODIMENT

Figure 1:
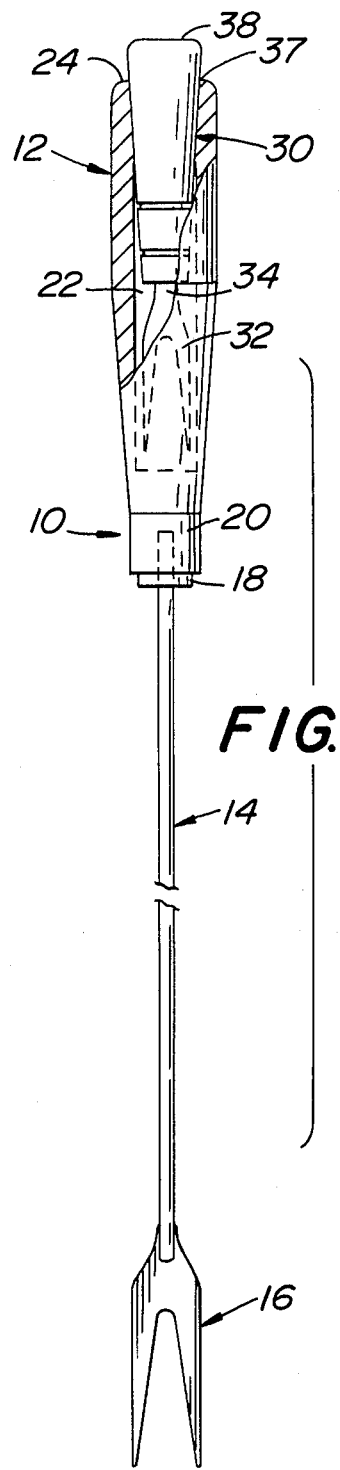
FIG. 1 is a partial sectional view of a combination fork according to the present invention.
Figure 2:
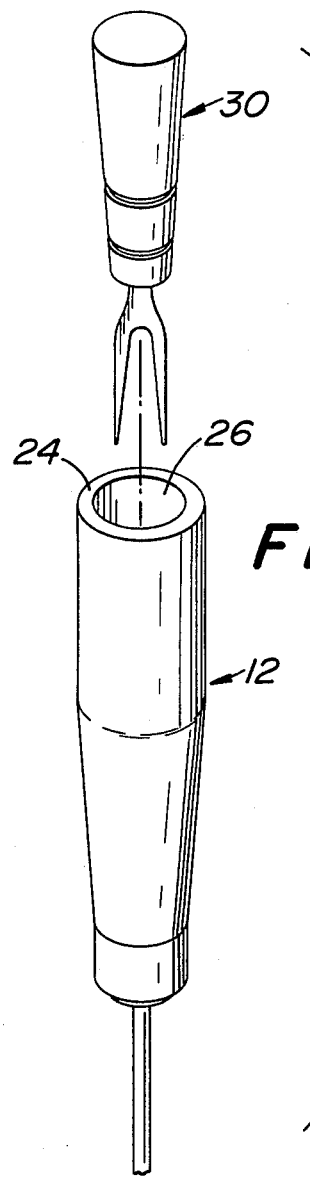
FIG. 2 is a perspective view of a portion of the present invention showing the smaller fork and the butt end of the handle of the larger fork.

Referring now to the drawings, wherein like numerals indicate like elements there is shown in FIG. 1 a combination fork 10 according to the present invention. Fork 10 comprises a handle 12, an elongated shaft 14 and tines 16. Shaft 14 and tines 16 may be preferably made of a metallic rust resistant material and having good neat conduction properties, such as chrome steel or aluminum. Shaft 14 may be embedded in a hole tapped in handle 12. A collar 18 may be affixed to shaft 14 to limit the distance that shaft 14 is embedded into handle 12. Shaft 14 may be affixed in handle 12 by a variety of known methods, such as by screw threads or adhesive, but there is shown in the present embodiment a clamp ring 20 which compresses handle 12 around the embedded portion of shaft 14 thereby securing shaft 14 into handle 12. Clamp ring 20 is preferably a metallic ring, such as steel or tin, having thermal expansion properties such that the ring may be heated to a larger diameter than the portion of handle 12 which it will cover, and then slid in place over handle 12 where it is allowed to cool and shrink in diameter to compress handle 12 around shaft 14.

Handle 12 itself may be of a variety of substances, although it is presently invisioned that handle 12 will be of wood or heat resistant plastic material. A cylindrical bore is provided in handle 12. The butt end 24 of handle 12 is open to provide a mouth 26 of bore 22.

A smaller fork 30 is provided to be used in combination with fork 10. Fork 30 has dimensions normally associated with a fork used as an eating utensil. Fork 30 may be of various types, but for aesthetic appeal the tines 32 in fork 30 are similar to the tines 16 of fork 10. The shaft 34 of fork 30 may be very short as is the norm in an eating sized fork.

The handle 36 of fork 30 is generally cylindrical, but has a gentle conical taper enlarging the diameter of handle 36 toward the butt end 38 thereof. At some point intermediate handle 36, the diameter of handle 36 exceeds the diameter of bore 26.

Fork 30 has overall dimensions such that the distance from the point on handle 36 wherein the diameter of handle 36 exceeds the diameter of bore 26 is less than the length of bore 26. Thus, fork 30 may be inserted into and force-fit into bore 26 by inserting it into bore 26 with the tines 32 first and pushing fork 36 forward until it has reached or just slightly passed the point 37 at which the diameter of handle 36 is greater than the diameter of bore 26.

In this stored position the combination fork 10 will function simply as a large barbecue fork, for moving meat on a grill or for holding a skewered piece of meat in the proper position above a source of heat. When the meat is cooked, smaller fork 30 may be removed from the handle of fork 10 and used to remove the impaled meat, and may also be used for eating the meat. Thus, there is provided a very handy combination fork wherein there is no longer a necessity for bringing two separate sets of forks. This invention may particularly useful in camping or as an outdoor set that will be carried with a charcoal grill. Moreover, it will be particularly useful wherein a set of forks and a fork holding frame is provided as in my co-pending application filled this same day.

From the above, it may seen that the aforementioned objects of this invention have been accomplished. The present invention may be embodied in other specific forms without departing from the spirt or essential attributes thereof and, accordingly, reference should be made to the appended claims, rather than the foregoing specification, as indicating the scope of the invention.

I claim:

1. A fork comprising a handle, an elongated shaft, and tines, for cooking food morsels impaled on the tines over an open source of heat, wherein the handle includes at the butt end thereof an open bore, and a smaller fork force-fit into said bore and being extractable from said bore to remove the cooked food morsel from the tines of the larger fork.

2. A combination fork as in claim 1 wherein said smaller fork has a handle which projects beyond said bore to provide a surface area for grasping the smaller fork when extracting the same from the bore.

3. A combination fork as in claim 2 wherein the bore is generally cylindrical.

4. A combination fork as in claim 3 wherein the bore extends substantially the length of the handle.

5. A combination fork as in claim 4 wherein the smaller fork is inserted tines first into the bore and the force-fit is accomplished by the cooperation of the bore and the handle of the smaller fork.

6. A combination fork as in claim 5 wherein the smaller fork handle has a conical taper enlarging toward the butt end thereof, whereby force-fit is accomplished by pushing the small fork into the bore until the diameter of taper equals or slightly exceeds the diameter of the mouth of the bore.

* * * * *